US008222332B2

(12) United States Patent
Kohashi et al.

(10) Patent No.: US 8,222,332 B2
(45) Date of Patent: *Jul. 17, 2012

(54) RESIN COMPOSITIONS FOR WRINKLE PATTERN PAINTS

(75) Inventors: Taichiro Kohashi, Yokohama (JP);
Hiroki Mizutani, Yokohama (JP);
Yoshitomo Takeuchi, Yokohama (JP);
Futoshi Nakanishi, Hyogo (JP)

(73) Assignee: BASF Coatings Japan Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/934,774

(22) PCT Filed: Jan. 27, 2009

(86) PCT No.: PCT/IB2009/000161
§ 371 (c)(1), (2), (4) Date: Sep. 27, 2010

(87) PCT Pub. No.: WO2009/118590
PCT Pub. Date: Oct. 1, 2009

(65) Prior Publication Data
US 2011/0015318 A1 Jan. 20, 2011

(30) Foreign Application Priority Data

Mar. 27, 2008 (JP) .................. 2008-085035

(51) Int. Cl.
*C08K 5/42* (2006.01)
(52) U.S. Cl. .................................................. 524/157
(58) Field of Classification Search ............... 524/157
See application file for complete search history.

(56) References Cited

U.S. PATENT DOCUMENTS

| 5,066,698 A | 11/1991 | Hazan et al. | |
|---|---|---|---|
| 2003/0049369 A1* | 3/2003 | Tanaka et al. | 427/162 |
| 2004/0202873 A1* | 10/2004 | Shibato et al. | 428/447 |

FOREIGN PATENT DOCUMENTS

| EP | 1764161 A1 | 3/2007 |
|---|---|---|
| JP | 03-010671 A | 1/1991 |
| JP | 05-039443 A | 2/1993 |
| JP | 05-320578 A | 12/1993 |
| JP | 11-124501 A | 5/1999 |

OTHER PUBLICATIONS

International Search Report for International application No. PCT/IB2009/000161 dated Jul. 29, 2009.
Written Opinion for International application No. PCT/IB2009/000161.

* cited by examiner

*Primary Examiner* — Milton I Cano
*Assistant Examiner* — John Uselding
(74) *Attorney, Agent, or Firm* — Cantor Colburn LLP

(57) ABSTRACT

A resin composition comprises (A) hydroxyl group containing acrylic resin having a hydroxyl group value of from 5 to 200 mgKOH/g and a number average molecular weight of from 500 to 20,000, (B) hexakisalkoxymethylated melamine resin, (C) de-watering agent, (D) blocked sulfonic acid compound, (E) silicate compound and (F) at least one type of material selected from among (a) organic resin particle of average particle diameter not more than 40 μm, (b) inorganic glass particles of average particle diameter not more than 100 μm and (c) inorganic fibers of average length not more than 300 μm.

5 Claims, 1 Drawing Sheet

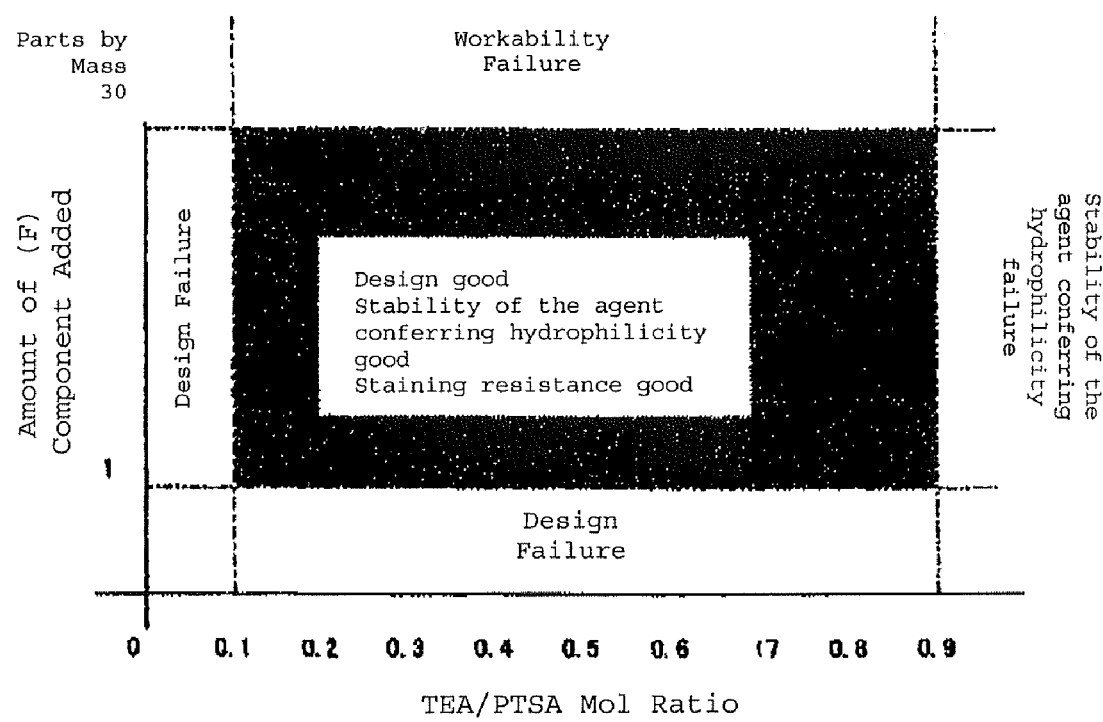

RESIN COMPOSITIONS FOR WRINKLE PATTERN PAINTS

CROSS REFERENCE TO RELATED APPLICATIONS

This application is a National Phase Application of Patent Application PCT/IB2009/000161 filed on 27 Jan. 2009, which claims priority to JP 2008-085035, filed 27 Mar. 2008, both of which are hereby incorporated by reference in their entirety.

TECHNICAL FIELD

The invention concerns resin compositions which can be used in paints for forming wrinkle patterned paint films.

BACKGROUND OF THE INVENTION

A wrinkle paint which contains, per 100 parts by weight of a mixture comprising (A) from 40 to 95 parts by weight acrylic resin of hydroxyl group value from 40 to 200, (B) from 5 to 60 parts by weight of low nuclear melamine resin which contains at least 40 wt % of hexakisalkoxymethylmelamine and (C) from 5 to 30 parts by weight of crosslinked type organic resin fine particles of average particle diameter from 0.01 to 10 μm, from 0.1 to 5 parts by weight as sulfonic acid of a sulfonic acid compound which has been blocked with a tertiary amine of boiling point from 80 to 150° C. is known as a paint with which paint films which have a wrinkle pattern can be obtained (see Japanese Examined Patent Publication H3-10671). However, in this case there is a disadvantage in that a stable wrinkle pattern is not obtained in the paint film.

Furthermore, a paint which is characterized in that it contains, per 100 parts by weight in total of (A) from 60 to 95 parts by weight of hydroxyl group containing paint film forming base resin and (B) from 5 to 40 parts by weight of low nuclear methylated melamine resin, (C) from 0.1 to 3 parts by weight as the amount of sulfonic acid of a reaction mixture of 1 equivalent of sulfonic acid and from 1.5 to 30 equivalents of secondary or tertiary amine of boiling point from 30 to 250° C. and (D) from 0.2 to 10 parts by weight of organopolysiloxane which has 2 or more as the total per molecule (blocked)isocyanate groups at the ends of the molecules is known as a paint with which paint films which have a fine wrinkle pattern design can be formed (see Japanese Unexamined Patent Application Laid Open H5-320578). However, in this case the wrinkle pattern design lacks stability with respect to the passage of time and, furthermore, there is a further disadvantage in that a wrinkle pattern design is not obtained in a stable manner due to slight changes in the painting conditions and, moreover, there is yet another problem in that the staining resistance when it is used outdoors is inadequate.

Furthermore, a paint which is characterized in that it contains per 100 parts by weight in total of (A) from 65 to 95 parts by weight of polyether resin which has a hydroxyl group value of from 5 to 110 and (B) from 5 to 35 parts by weight of low nuclear methylated melamine resin, (C) from 0.1 to 3 parts by weight of the sulfonic acid of a reaction mixture of 1 mol of sulfonic acid and at least 7.2 mol of secondary amine, (D) from 1 to 15 parts by weight of fine silica powder of average particle diameter not more than 10 μm and (E) from 1 to 30 parts by weight of one or more type of material selected from among organic resin particles and inorganic glass particles of average particle diameter from 2 to 70 μm and organic resin fibers and inorganic fibers of average diameter from 2 to 50 μm is known as a paint with which paint films which have a wrinkle pattern design which has good corrosion resistance and excellent design potential and pattern stability can be formed (see Japanese Unexamined Patent Application Laid Open H5-039443). However, in this case the mol ratio of secondary amine to sulfonic acid is excessive and so there is a disadvantage in that when an organosilicate-based agent for providing hydrophilicity is combined the hydrophilic performance declines over a short period of time.

Furthermore, a thermosetting resin composition which contains (A) a film-forming polyol resin of which the hydroxyl value is from 5 to 300 mgKOH/g and the number average molecular weight is from 500 to 20,000, (B) a hardening agent which can react with the abovementioned film-forming polyol resin (A), (C) an organosilica sol of particle diameter from 10 to 100 nm and of which degree of hydrophobicity expressed as the hexane tolerance value is at least 15.0 ml and (D) at least one type of material selected from among the partially hydrolyzed condensates of alkoxysilane compounds is known as a thermosetting resin composition with which hardened materials which have excellent staining resistance outdoors are obtained (see Japanese Unexamined Patent Application Laid Open H11-124501). However, in this case there is a disadvantage in that the wrinkle pattern design of the hardened material is not stable even if the hardening agent is a low nuclear melamine resin and an acid catalyst where an aromatic sulfonic acid has been blocked with equimolar amine is used.

The present invention is intended to provide resin compositions which can be used in wrinkle pattern paints with which it is possible to form paint films with which the wrinkle pattern design of the paint film is stable with respect to the passage of time and which, moreover, have excellent paint film staining resistance even in cases where they are used outdoors.

SUMMARY OF THE INVENTION

As a result of a thorough investigation carried out with a view to resolving the abovementioned problems, the inventors have discovered that on using a specified hydroxyl group containing acrylic resin, setting the mol ratio of sulfonic acid and tertiary amine compound which blocks the sulfonic acid in a specified range and combining a specified particulate or fibrous aggregate the wrinkle pattern design of the paint film is stable with respect to the passage of time, and they have also discovered that the staining resistance is improved without losing the stability of the wrinkle pattern if a specified organosilicate, condensate thereof or partial hydrolyzate of said condensate is also combined, and the invention is based upon these discoveries.

That is to say, the invention provides a resin composition which contains (A) hydroxyl group containing acrylic resin of which the hydroxyl group value is from 5 to 200 mgKOH/g and the number average molecular weight is from 500 to 20,000, (B) hexakisalkyoxymethylated melamine resin, (C) de-watering agent, (D) blocked sulfonic acid compound which has been blocked with a tertiary amine compound of boiling point from 50 to 300° C. where the mol ratio with respect to the sulfonic acid is from 0.2 to 0.9, (E) silicate compound and (F) at least one type of material selected from among (a) organic resin particles of average particle diameter not more than 40 μm, (b) inorganic glass particles of average particle diameter not more than 100 μm and (c) inorganic fibers of average length not more than 300 μm in which the mass ratio of the (A) component and the (B) component as solid fractions is from 60/40 to 90/10, and in which, per 100 parts by mass in total as the solid fractions of the (A) component and the (B) component, the amount of the (C) component included as solid fraction is from 0.1 to 10 parts by mass, the amount of the (D) component included as solid fraction is from 0.1 to 5 parts by mass, the amount of the (E) component included as solid fraction is from 0.5 to 10 parts by mass and the amount of the (F) component included as solid fraction is from 1 to 30 parts by mass.

Furthermore, the invention provides a resin composition in which, in the abovementioned resin composition, the (E) component silicate compound is an organosilicate which can be represented by general formula (1) which is indicated below, an organosilicate which can be represented by general formula (2) which is indicated below, a condensate of one or both of the aforementioned two types of organosilicate or a partial hydrolyzate of said condensate.

General Formula (1)

(In this formula $R^1$ is a phenyl group or an alkyl group which has from 1 to 18 carbon atoms, and $R^2$ is an alkyl group which has from 1 to 6 carbon atoms.)

General Formula (2)

(In this formula $R^3$ is a hydrogen atom or an alkyl group which has from 1 to 6 carbon atoms.)

DETAILED DESCRIPTION OF THE DRAWING

FIG. 1 illustrates the relationship of the effect of the invention with the mol ratio of triethylamine (TEA) with respect to p-toluenesulfonic acid (PTSA) in the (D) component blocked sulfonic acid compound versus the amount of (F) component particles or fibers added.

If a resin composition of this invention is used in a wrinkle pattern paint then a wrinkle pattern paint film of which the wrinkle pattern design of the paint film is stable with the passage of time and which has excellent staining resistance can be obtained.

DETAILED DESCRIPTION OF A PREFERRED EMBODIMENT OF THE INVENTION

The present invention is a resin composition which contains (A) specified hydroxyl group containing acrylic resin, (B) hexakisalkoxymethylated melamine resin, (C) de-watering agent, (D) specified blocked sulfonic acid compound which is blocked with a specified tertiary amine compound, (E) silicate compound and (F) specified particles and/or fibers, and it can be used as a resin composition for wrinkle pattern paints.

In this invention the hydroxyl group containing resin which forms the (A) component is the resin which forms the base resin of the resin composition for wrinkle pattern paints and realizes the basic performance (flexibility, hardness, durability etc.) of the paint films which are formed, and it reacts with the (B) component melamine resin.

The hydroxyl group value of the (A) component hydroxyl group containing acrylic resin is from 5 to 200 mgKOH/g, preferably from 10 to 150 mgKOH/g and most desirably from 20 to 100 mgKOH/g. With a hydroxyl group value of less than 5 mgKOH/g the crosslink density of the hardened paint film is low and so the solvent resisting performance is reduced, and if the hydroxyl group value exceeds 200 mgKOH/g then the crosslink density in the hardened paint film is too high and so the workability is reduced.

The number average molecular weight of the (A) component hydroxyl group containing acrylic resin is from 500 to 20,000, preferably from 700 to 15,000, and most desirably from 1,000 to 10,000. With a number average molecular weight of less than 500 the crosslink density in the hardened paint film is too high and so the workability is reduced, and if the number average molecular weight exceeds 20,000 then crosslink density of the hardened paint film is too low and so the solvent resisting performance is reduced.

The (A) component hydroxyl group containing acrylic resin can be obtained using a known method such as the radical polymerization method. When the radial polymerization method is used it is possible to obtain the (A) component hydroxyl group containing acrylic resin by the copolymerization of radically polymerizable acrylic monomer which has a hydroxyl group with other copolymerizable radically polymerizable monomer as required, or by the copolymerization of radically polymerizable acrylic monomer, radically polymerizable monomer which has a hydroxyl group and other copolymerizable radically polymerizable monomer as required.

Actual examples of radically polymerizable monomers which have a hydroxyl group include 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, adducts of acrylic acid and versatic acid glycidyl ester, adducts of methacrylic acid and versatic acid glycidyl ester; radically polymerizable acrylic monomers which have hydroxyl groups such as the ethylene oxide and/or propylene oxide adducts of (meth)acrylic acid hydroxyalkyl esters such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate and 4-hydroxybutyl methacrylate, and alcohols which have an unsaturated double bond such as allyl alcohol. One type of radically polymerizable monomer which has a hydroxyl group can be used or a combination of two or more types can be used.

Examples of other copolymerizable radically polymerizable monomers include radically polymerizable acrylic monomers such as methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate and stearyl methacrylate, and monomers which have an unsaturated bond such as styrene, acrylonitrile, methacrylonitrile and the like. One of these monomers may be used alone, or a combination of two or more types may be used.

Examples of radical polymerization initiators include azo compounds such as 2,2'-azobisisobutyronitrile, 2,2'-azobis-2,4-dimethylvaleronitrile, 4,4'-azobis-4-cyanovalerianic acid, 1-azobis-1-cyclohexane-carbonitrile, dimethyl-2,2'-azobisisobutyrate and the like, and organic peroxides such as methyl ethyl ketone peroxide, cyclohexanone peroxide, 3,5,5-trimethylhexanone peroxide, 1,1-bis(t-butylperoxy)3,3,5-trimethylcyclohexane, 1,1-bis(t-butylperoxy)cyclohexane, 2,2-bis(t-butylperoxy)octane, t-butyl hydroperoxide, isopropylbenzene hydroperoxide, dicumyl peroxide, t-butylcumyl peroxide, isobutyl peroxide, lauroyl peroxide, benzoyl peroxide, diisopropylperoxydicarbonate, t-butylperoxy 2-ethylhexanoate, t-butylperoxy neodecanate, t-butylperoxy laurate, t-butylperoxy benzoate, t-butylperoxy isopropyl carbonate, t-butylperoxy acetate and the like. One of these radical polymerization initiators may be used, or a combination of two or more types may be used.

No particular limitation is imposed upon the amount of radical polymerization initiator compounded, but it is preferably from 0.01 to 20 mass % with respect to the total mass of radically polymerizable monomer. Furthermore, the radical polymerization temperature differs according to the type of radical polymerization initiator but the polymerization is preferably carried out under conditions of from 50 to 200° C., and it is most desirably carried out under conditions of from 80 to 160° C.

Examples of organic solvents which can be used in the abovementioned production of a hydroxyl group containing acrylic resin include alicyclic hydrocarbons such as cyclohexane, ethylcyclohexane and the like, aromatic hydrocarbon-based solvents such as toluene, xylene, ethylbenzene, aromatic naphtha and the like, ketone solvents such as acetone, methyl ethyl ketone, methyl isopropyl ketone, cyclohexanone, isophorone and the like, ester-based solvents such as ethyl acetate, n-butyl acetate, methoxypropyl acetate, isobutyl acetate, 3-methoxybutyl acetate, bis(2-ethylhexyl) adipate and the like, ether-based solvents such as dibutyl ether, tetrahydrofuran, 1,4-dioxane, 1,3,5-trioxane and the like, and nitrogen-containing solvents such as acetonitrile, valeronitrile, N,N-dimethylformamide, N,N-diethylformamide and the like. There may be one type of organic solvent, or the solvent may be a mixed solvent comprising a plurality of two or more types. At this time the solid fraction concentration of the hydroxyl group containing resin can be selected optionally within the range where the dispersion stability of the resin is not lost, but generally the solid fraction concentration is from 10 to 70 mass %.

The (A) component hydroxyl group containing acrylic resin can also be produced by condensation polymerization by means of the ester exchange of a polyhydric alcohol and a lower alkyl ester of a poly-basic carboxylic acid. Moreover, the (A) component hydroxyl group containing acrylic resin can also be obtained by the ring-opening polymerization of lactones such as β-propiolactone, δ-valerolactone, ε-caprolactone and the like.

In this invention the (B) component hexakisalkyoxymethylated melamine resin fulfills the role of reacting with the hydroxyl groups of the (A) component and forming a crosslink structure and the role of imparting a wrinkle pattern to the paint film. The (B) component hexakisalkoxymethylated melamine resin is a methylated melamine resin which has six alkoxy groups. The methylated melamine resin is a compound which has six methylol groups where formaldehyde has been added to the three amino groups of the melamine ring, and the (B) component hexakisalkoxymethylated melamine resin is a compound where the aforementioned six methylol groups have been alkoxylated.

The six terminal alkyl group of the (B) component (the alkyl groups on the hexakisalkoxy groups) may be methyl groups, isopropyl groups, n-butyl groups or the like, but methyl groups are the most desirable.

Hexakisalkoxymethylated melamine resins which are available commercially include Cymel 300 and Cymel 303 (trade names, produced by the Nippon Cytec Co.), Nikalac MW-30 (trade name, produced by the Sanwa Chemical Co.) and the like.

In this invention the mass ratio of the (A) component and the (B) component as solid fractions is from 60/40 to 90/10, preferably from 70/30 to 90/10, and most desirably from 75/25 to 85/15. In those cases where there is less of the (A) component than a mass ratio of the (A) component and the (B) component as solid fractions of 60/40 the soft resin component is insufficient and satisfactory workability is not obtained, and in those cases where there is more of the (A) component than a mass ratio of the (A) component and the (B) component as solid fractions of 90/10 the paint film crosslinking component is insufficient and the solvent resistance is reduced.

In this invention the (C) component de-watering agent can remove the moisture from the system and maintain the stability of the agent for conferring hydrophilicity which reacts readily with moisture. Examples of the de-watering agent include chemical de-watering agents such as trimethyl orthoformate, triethyl orthoformate, trimethyl orthoacetate, triethyl orthoacetate, 2,2-dimethoxypropane, 3-ethyl-2-methyl-2-(3-methylbutyl)-1,3-oxazolidine and the like, and physical de-watering agents such as molecular sieves. Furthermore, commercially available materials include OFE, OFM, MOA, 2,2-DMP, EOA (all product names, produced by the Nihho Kagaku Co.), ZOLDINE MS-PLUS (product name, produced by the US Angus Co.) and the like. One of these or a mixture of two or more types can be used.

In this invention the (D) component blocked sulfonic acid compound which is blocked with a specified proportion of a tertiary amine compound is a salt of the sulfonic acid with a specified proportion of tertiary amine compound and generally the action as a catalyst of a specified proportion of the sulfonic acid is blocked. That is to say, the sulfonic acid is the reaction catalyst for the (A) component and the (B) component and it shortens the reaction time and markedly increases the difference between the surface hardening and the internal hardening of the paint film and provides a good wrinkle pattern, but by forming a salt with a tertiary amine compound this catalytic action is temporarily blocked.

The boiling point of the tertiary amine which is used in the (D) component blocked sulfonic acid compound which is blocked with a tertiary amine compound is from 50 to 300° C. and preferably from 80 to 150° C. In those cases where the boiling point of the tertiary amine is less than 50° C. the volatility is high and so the design stability of the wrinkle pattern with the passage of painting time is reduced, and in those cases where it exceeds 300° C. the volatility is low and so it is difficult to form a wrinkle pattern design.

Examples of the tertiary amine of the (D) component include triethylamine, tributylamine, triallylamine, N-methyldiallylamine, N-methylmorpholine, N,N,N',N'-tetramethyl-1,2-diaminoethane, N-methylpiperidine, pyridine, 4-ethylpyridine and the like. One of these can be used alone or a mixture of two or more types can be used, but the use of triethylamine is especially desirable.

Examples of the sulfonic acid which can be used for the (D) component include p-toluenesulfonic acid, dodecylbenzenesulfonic acid, dinonylnaphthalenedisulfonic acid, methanesulfonic acid, dinonylnaphthalenesulfonic acid and the like. One of these can be used alone or a mixture of two or more types can be used. The use of p-toluenesulfonic acid is especially desirable.

One of the main distinguishing features of the invention is that the mol ratio of tertiary amine compound with respect to the sulfonic acid for blocking the sulfonic acid with tertiary amine compound is from 0.2 to 0.9, and preferably from 0.3 to 0.8.

In those cases where the mol ratio of tertiary amine with respect to the sulfonic acid is less than 0.2 the amount of tertiary amine is insufficient and a good wrinkle pattern design cannot be formed, and in those cases where it exceeds 0.9 there is too much tertiary amine and the stability of the agent conferring hydrophilicity is reduced.

The relationship of the mol ratio of tertiary amine compound with respect to the sulfonic acid and the particulate or fibrous aggregate of the (F) component is closely related to the stability of the wrinkle pattern design.

In this invention the (F) component contributes to the formation of the wrinkle pattern design and the stability of the design, and in practical terms at least one type of material selected from among (a) organic resin particles of average particle diameter not more than 40 μm, (b) inorganic glass particles of average particle diameter not more than 100 μm, and (c) inorganic fibers of average length not more than 300 μm is used.

The preferred average diameter of the organic resin particles (a) is not more than 40 μm, more desirably not more than 35 μm and most desirably not more than 30 μm. In those cases where the average particle diameter exceeds 40 μm the appearance of the paint film is poor. Generally a lower limit of 1 μm or above is desirable for the average particle diameter of the organic resin particles. Examples of commercially available organic resin particles include Techpolymer MBX-5, MBX-12 and MBX-30 (trade names, produced by the Sekisui Kaseihin Kogyo Co.) and the like.

The preferred average diameter of the inorganic glass particles (b) is not more than 100 μm, more desirably not more than 80 μm and most desirably not more than 50 μm. In those cases where the average particle diameter exceeds 100 μm the appearance of the paint film is poor. Generally a lower limit of 1 μm or above is desirable for the average particle diameter of the inorganic glass particles. Examples of commercially available inorganic glass particles include Crystalite AA, VV-S and VX-S2 (trade names, produced by Tatsumori), Greendensic #600, #800 and #1200 (trade names, produced by the Showa Denko Co.) and the like.

The preferred average length of the inorganic fibers (c) is not more than 300 μm, more desirably not more than 250 μm and most desirably not more than 200 μm. In those cases where the average length exceeds 300 μm the appearance of the paint film is poor. Generally a lower limit of 5 μm or above is desirable for the average length of the inorganic fibers. Generally the preferred average diameter of the inorganic fibers is from 1 to 40 μm.

Examples of commercially available inorganic fibers include Surfestrand REV1, REV4 and REV8 (trade names, produced by the Japan Plate Glass Co.), EGP-200, EGP-200-10, EFH-100-31 and EFH150-31 (trade names, produced by the Central Glass Co.) and the like.

In this invention a silicate compound is used for the (E) component. The (E) component renders the paint film surface hydrophilic and improves the stain resisting performance.

The use of organosilicates which can be represented by general formula (1) and general formula (2), condensates of either one or both of the aforementioned two types of organosilicate or partial hydrolyzates of said condensates are preferred for the (E) component silicate compound.

$$R^1\text{—Si—}(OR^2)_3 \qquad (1)$$

$$Si\text{—}(OR^3)_4 \qquad (2)$$

In general formula (1) $R^1$ is a phenyl group or an alkyl group which has from 1 to 18 carbon atoms, preferably from 1 to 14 atoms and most desirably from 1 to 9 carbon atoms. If an organosilicate in which the number of carbon atoms in the organic group represented by $R^1$ exceeds 18, and/or a condensate thereof, is used then there is not sufficient surface orientation when a paint film is formed and so the paint film surface is not rendered hydrophilic and a good stain resisting performance is not obtained.

Furthermore, $R^2$ in general formula (1) is an alkyl group which has from 1 to 6 carbon atoms, and preferably an alkyl group which has from 1 to 3 carbon atoms. If an organosilicate in which the number of carbon atoms in the organic group represented by $R^2$ exceeds 6, and/or a condensate thereof, is used then the rate of hydrolysis is slow.

Furthermore, $R^3$ in general formula (2) is a hydrogen atom or an alkyl group which has from 1 to 6 carbon atoms, and preferably an alkyl group which has from 1 to 3 carbon atoms. If an organosilicate in which the number of carbon atoms of the alkyl group represented by $R^3$ exceeds 6, and/or a condensate thereof, is used then the rate of hydrolysis is slow.

Actual examples of the abovementioned general formula (1) include trimethoxybutylsilane, trimethoxyethylsilane and the like.

Actual examples of the abovementioned general formula (2) include tetrahydroxysilane, tetramethoxysilane, tetraethoxysilane, tetrapropoxysilane, tetrabutoxysilane, tetraphenoxysilane, dimethoxydiethoxysilane and the like.

One of these or a combination of two or more types can be used.

Furthermore, the organosilicate condensates are branched or linear chain-like condensates obtained by condensing one type, or two or more types, of organosilicate which can be represented by the aforementioned general formula (1) and general formula (2), and the linear chain condensates which have a degree of condensation of from 2 to 100 are preferred. If the degree of condensation exceeds 100 then the staining resistance effect is slight and the workability of the paint film is also reduced and so this is undesirable. The condensates which have a degree of condensation of from 2 to 50 are especially desirable as the organosilicate condensates which are used in the invention.

Examples of commercial organosilicate condensate products include MKC Silicate MS51, MS56, MS57 and MS58B15 (trade names, produced by the Mitsubishi Kagaku Co.), Ethylsilicate 40, Ethylsilicate 48 and EMS-485 (trade names, produced by the Alcoat Co.) and the like.

The proportions in which the (C) to (F) components of this invention are included in the resin composition are preferably, per 100 parts by mass as total solid fraction of the (A) component and the (B) component, from 0.1 to 10 parts by mass as solid fraction of the (C) component de-watering agent, from 0.1 to 5 parts by mass as solid fraction of the (D) component blocked sulfonic acid compound, from 0.5 to 10 parts by mass as solid fraction of the (E) component silicate compound and from 1 to 30 parts by mass as solid fraction of the (F) component particulate or fibrous aggregate.

More desirably, the amount of the (C) component included is from 0.5 to 5 parts by mass, and if the amount is less than 0.1 part by mass then the de-watering effect in inadequate and the stability of the agent conferring hydrophilicity is unsatisfactory, and in those cases where the amount exceeds 10 parts by mass design stability of the wrinkle pattern is not obtained.

More desirably the amount of the (D) component included is from 0.3 to 5 parts by mass, and if the amount is less than 0.1 part by mass then adequate hardening is not carried out and the solvent resistance is reduced, and in those cases where the amount exceeds 5 parts by mass the stability of the agent conferring hydrophilicity is reduced by the excess of tertiary amine compound.

More desirably the amount of the (E) component included is from 0.5 to 5 parts by mass, and if the amount is less than 0.5 part by mass then the surface is not rendered hydrophilic satisfactorily and so good stain resisting performance is not obtained, and in those cases where the amount exceeds 10 parts by mass the water resisting performance is reduced.

More desirably the amount of the (F) component included is from 5 to 25 parts by mass, and with an amount less than 1 part by mass a stable wrinkle pattern design cannot be formed, and in those cases where the amount exceeds 30 parts by mass the workability is reduced.

In addition to the abovementioned essential components, inorganic pigments such as titanium dioxide, carbon black, iron oxide, chrome yellow and the like, organic pigments such as cyanine green, cyanine blue and the like, metal powders such as aluminum powder, copper powder and the like, true pigments such as barium sulfate, talc, mica and the like, additives such as pigment dispersing agents, leveling agents, settling inhibitors, anti-foaming agents and the like, and one or more type of solvent may be included, as required, in a resin composition of this invention.

The resin compositions of this invention can be produced by mixing together each of the abovementioned components. The method of painting involves dilution to the painting viscosity with a solvent such as xylol or the like, as required, and forming a paint film which has a wrinkle pattern by painting and then baking for from 20 to 120 seconds at a high temperature of from 200 to 300° C. The paint film obtained has good workability and since it is baked for a short time the compositions are suitable as paints for pre-coated metal purposes, but they are not limited to this application and they can also be used as paints for post-coating purposes.

In those cases where a resin composition of this invention is used as a clear or color-clear paint it may be painted directly onto a base material such as steel, galvanized steel sheet, stainless steel, aluminum and the like, it may be painted on a base material which has been painted with a primer, or it may be painted on the usual pre-coated metal steel sheets. In those cases where a wrinkle pattern paint of this invention is used as an enamel paint it should be used in the same way as the usual enamel paints. The wrinkle pattern paints of this invention can be painted using a bar coater, a flow coater, a roll coater, a roll-flow coater, a spray gun or the like. They can also be used for embossed steel sheets to improve design characteristics.

If, after painting, the resin compositions of this invention are baked at a high temperature of from 200 to 300° C. then the tertiary amine compound which has been blocked in the paint film close to the surface is released and evaporates and the sulfonic acid which is released at the same time has its catalytic action restored and the curing reaction occurs quickly in just the surface layer and, as a result of this, a paint film which has a wrinkle pattern is obtained and the heating and hardening is completed in a short time of from 20 to 120 seconds. The paint film which is produced has a crepe-like fine roughness in a two-dimensional non-specific direction, and the size and form of the roughness varies according to the composition of the wrinkle pattern paint, the film thickness conditions and the baking conditions for example, and a paint film which has any wrinkle pattern can be obtained by adjusting these features. Furthermore, the paint film obtained has excellent workability, adhesion, corrosion resistance, staining resistance and the like, and even on carrying out working after paint film formation the appearance, workability, adhesion, corrosion resistance, staining resistance and the like are unchanged.

ILLUSTRATIVE EXAMPLES

The invention is described in more practical terms below by means of illustrative examples. Moreover, the invention is not limited in any way by these illustrative examples.

Example of the Production of an (A) Component Hydroxyl Group Containing Acrylic Resin Xylene (45 parts by mass) and 22 parts by mass of n-butyl acetate were introduced into a four-necked flask which had been furnished with a thermometer, a stirrer, a condenser and a dropping funnel and heated to the reflux temperature, 135° C. Then, while stirring, a mixture of 1.3 part by mass of acrylic acid, 11.6 parts by mass of 2-hydroxyethyl methacrylate, 30 parts by mass of styrene, 6.1 parts by mass of methyl methacrylate, 51 parts by mass of n butyl methacrylate and 1 part by mass of Perbutyl Z (trade name, produced by the Nippon Oil Co.) as a radical polymerization initiator was added dropwise from the dropping funnel over a period of 3 hours. One hour after the drip feed had been completed 0.2 part by mass of the aforementioned polymerization initiator was added dropwise together with 1 part by mass of xylene and then the mixture was maintained at the same temperature for 2 hours and a hydroxyl group containing acrylic resin of hydroxyl group value 50 mgKOH/g, acid value 10 mgKOH/g and solid fraction 60 mass % was obtained. Furthermore, the number average molecular weight calculated as styrene according to GPC was 9800.

Production of a (D) Component Sulfonic Acid Compound which is Blocked with a Tertiary Amine Compound A 50 mass % isopropanol solution (27 parts by mass) of p-toluenesulfonic acid (PTSA) and 12.7 parts by mass of triethylamine (TEA, boiling point 89.4° C.) were mixed in a reaction vessel and then stirred until the whole mixture was uniform and a blocked sulfonic acid compound (TEA/PTSA mol ratio (theoretical value)=0.6) was obtained.

Blocked sulfonic acid compounds where p-toluenesulfonic acid had been blocked with triethylamine in such a way that the mol ratio (theoretical value), was from 0.3 to 0.8 were obtained in the same way as described above.

Examples 1 to 15 and Examples 17 and 18

Production of White Paints for Pre-Coated Metal Purposes

The hydroxyl group containing acrylic resin indicated in the example of production (80 parts by mass as solid fraction) and 50 parts by mass of titanium oxide were dispersed using a sand mill in 30 parts by mass of a mixed solvent (a solvent mixture in which Solvesso #100 (trade name, an aromatic petroleum naphtha, produced by the Esso Co.) and cyclohexanone had been mixed in the proportions of 50/50 as parts by mass) until the particle size of the pigment reached 10 μm. Subsequently the other raw materials indicated in Table 1 and Table 2 (where each raw material is indicated as a solid fraction ratio, excluding solvent) were added and admixed to form white paints. The paints obtained were subjected to viscosity adjustment with the abovementioned mixed solvent to 120±10 seconds with a Ford cup No. 4 (25° C.). Moreover, the amounts of the raw materials compounded indicated in Table 1 and Table 2 are parts by mass (indicted as solid fraction).

Example 16

Production of a Clear Paint for Pre-Coated Metal Purposes

The hydroxyl group containing acrylic resin indicated in the example of production (60 parts by mass as solid fraction) and the other raw materials indicated in Table 2 were all added and mixed together to form a clear paint. The paint obtained was subjected to viscosity adjustment with the abovementioned mixed solvent to 120±10 seconds with a Ford cup No. 4 (25° C.)

Comparative Examples 1 to 16

Titanium oxide was dispersed and the raw materials indicated in Table 4 and Table 5 were added and admixed in essentially the same way as in the examples to form white paints. The paints obtained were subjected to viscosity adjustment with the abovementioned mixed solvent to 120±10 seconds with a Ford cup No. 4 (25° C.) Moreover, the amounts of the raw materials compounded indicated in Table 4 and Table 5 are parts by mass (indicted as solid fraction).

The raw material components in Tables 1, 2, 4 and 5 are shown below.
1) Cymel 303: Hexamethoxymethylated melamine (product name, produced by the Nippon Cytec Industries Co., solid fraction 100 mass %)
2) OFE: Orthoformic acid ethyl ester (product name, produced by the Nihho Kagaku Co., solid fraction 98 mass %)
3) MKC Silicate MS56: Silicate compound (methylsilicate) (product name, produced by the Mitsubishi Kagaku Co.)
4) NKC Silicate MS58B15: Silicate compound (15% butyl group modified methylsilicate) (product name, produced by the Mitsubishi Kagaku Co.)
5) MBX-30: Organic resin particles, Average particle size 30 μm (crosslinked poly(methyl methacrylate)) (product name, produced by the Sekisui Kaseihin Kogyo Co.)
6) MBX-50: Organic resin particles, Average particle size 50 μm (crosslinked poly(methyl methacrylate)) (product name, produced by the Sekisui Kaseihin Kogyo Co.)
7) Blasting Beads J-320: Inorganic glass particles, average particle diameter 50 μm (product name, produced by the Toshiba Ballotini Co.)
8) Blasting Beads J-46: Inorganic glass particles, average particle diameter 360 μm (product name, produced by the Toshiba Ballotini Co.)
9) Surfestrand REV-4: Inorganic fibers, average diameter 13 μm, average length 70 μm (product name, produced by the Japan Plate Glass Co.)
10) ECS03-350: Inorganic fibers, average length 3 mm (product name, produced by the Central Glass Co.)

Production of Specimens for Testing

Epoxy resin based primer (pre-color HP-32, trade name, produced by the BASF Coatings Japan Co.) was painted with a roll coater in such a way as to provide a dry paint film thickness of 5 μm on a Galvalium steel sheet of sheet thickness 0.27 mm which had been subjected to an application type chromate treatment and baked for 40 seconds under conditions such that the PMT (painted sheet maximum temperature reached) was 200° C. Then the paints of Examples 1 to 18 and Comparative Examples 1 to 16 were applied as top-coat paints using a roll coater in such a way as to provide a dry paint film thickness of 15 μm and baked for 50 seconds under conditions such that the PMT was 230° C. The results of evaluation are shown in Table 3 and Table 6.

Furthermore, property evaluation of the paint films which had been obtained with the paint compositions of this invention was carried out using the methods outlined below.

(1) Workability

The test specimen was cut to a width of 5 cm and, for 4T, 180° adhesion bending was carried out at a room temperature of 20° C. with the test specimen and four more of the painted sheets enclosed on the inside and with the paint film on the outside. Furthermore, for 6T, 180° adhesion bending was carried out with the test specimen and six more of the painted sheets enclosed on the inside and with the paint film on the outside. The evaluation involved subsequent peeling with cellophane tape and evaluation.
○: No peeling at all.
Δ: Peeling was observed with an area of less than 10%.
X: Peeling of 10% or more was observed.

(2) Hydrophilicity

A specimen was immersed in water for 1 hour, the water was removed from the surface and then the specimen was dried for 1 hour, after which the angle of contact was measured using a FACE automatic angle of contact measuring device (model CA-Z) produced by the Kyowa Kaimen Kagaku Co. and this was used as an indicator of the hydrophilicity.
○: Angle of contact of water less than 60°, good hydrophilicity.
X: Angle of contact of water 60° or above, poor hydrophilicity.

(3) Design Stability of the Wrinkle Pattern

The stability of the design of the wrinkle pattern was evaluated visually in the following way.
○: There was a rough feel to the wrinkle pattern and the pattern was uniform, and even when 6 hours had elapsed after adding the agent conferring hydrophilicity there was no change in these aspects and good design characteristics were retained.
X: There was no rough feel to the wrinkle pattern either immediately after adding the agent conferring hydrophilicity or after 6 hours had elapsed after adding the agent conferring hydrophilicity, and there was no uniformity and the design characteristics were poor.

(4) Solvent Resistance

The painted surface of the painted steel sheet was rubbed 100 times under a load of 1 kg with a gauze which contained xylene and the paint surface was examined. The evaluation criteria were as follows.
○: No change to the paint surface, good solvent resistance.
X: The paint film surface had dissolved in the xylene, poor solvent resistance.

(5) Water Resistance

The specimen was immersed for 240 hours in warm water at 40° C. and, after removing the water from the surface, the color difference (ΔL value) before and after the test was measured.
○: ΔL value less than 1, good water resistance
X: ΔL value 1 or more, poor water resistance (6) Staining Resistance A 10 mass % carbon black aqueous dispersion paste was deposited on the specimen surface and left to stand for 2 hours at a constant temperature of 50° C. in accordance with the staining resistance of JIS K-5400 (2000), 8.10.

Subsequently this was washed off with running water and the state of the paint film surface was observed visually and the stain resisting performance was evaluated in accordance with the following criteria.
○: No carbon black aqueous dispersion paste mark remained on the specimen.
X A pronounced carbon black aqueous dispersion paste mark remained on the specimen.

TABLE 1

| Example | | 1 | 2 | 3 | 4 | 5 | 6 | 7 | 8 | 9 |
|---|---|---|---|---|---|---|---|---|---|---|
| Titanium oxide | | 50 | 50 | 50 | 50 | 50 | 50 | 50 | 50 | 50 |
| Hydroxyl group containing acrylic resin | | 80 | 80 | 80 | 80 | 80 | 80 | 80 | 80 | 80 |
| Melamine resin | 1) | 20 | 20 | 20 | 20 | 20 | 20 | 20 | 20 | 20 |
| De-watering agent | 2) | 5 | 5 | 5 | 5 | 5 | 5 | 5 | 5 | 5 |
| Blocked sulfonic acid compound | | 1.5 | 1.5 | 1.5 | 1.5 | 1.5 | 1.5 | 0.3 | 4 | 1.5 |
| (Amine/Sulfonic acid (mol ratio)) | | (0.6) | (0.6) | (0.6) | (0.6) | (0.6) | (0.6) | (0.6) | (0.6) | (0.6) |
| Silicate compound | 3) | 5 | 5 | 5 | 5 | 5 | 5 | 5 | 5 | |
| Silicate compound | 4) | | | | | | | | | 5 |
| Organic resin particles | 5) | 20 | | | 10 | | 10 | 10 | 10 | 10 |
| Organic resin particles | 6) | | | | | | | | | |
| Inorganic glass particles A | 7) | | 20 | | 10 | 10 | | | | |
| Inorganic glass particles B | 8) | | | | | | | | | |
| Inorganic fibers A | 9) | | | 20 | | 10 | 10 | 10 | 10 | 10 |
| Inorganic fibers B | 10) | | | | | | | | | |

TABLE 2

| Example | | 10 | 11 | 12 | 13 | 14 | 15 | 16 | 17 | 18 |
|---|---|---|---|---|---|---|---|---|---|---|
| Titanium oxide | | 50 | 50 | 50 | 50 | 50 | 50 | 0 | 50 | 50 |
| Hydroxyl group containing acrylic resin | | 80 | 80 | 70 | 70 | 65 | 65 | 80 | 80 | 80 |
| Melamine resin | 1) | 20 | 20 | 30 | 30 | 35 | 35 | 20 | 20 | 20 |
| De-watering agent | 2) | 5 | 5 | 5 | 5 | 0.2 | 8 | 5 | 5 | 5 |
| Blocked sulfonic acid compound | | 1.5 | 1.5 | 1.5 | 1.5 | 1.5 | 1.5 | 1.5 | 1.5 | 1.5 |
| (Amine/Sulfonic acid (mol ratio)) | | (0.3) | (0.8) | (0.6) | (0.6) | (0.6) | (0.6) | (0.6) | (0.6) | (0.6) |
| Silicate compound | 3) | 5 | 5 | 0.7 | 9 | 5 | 5 | 5 | 5 | 5 |
| Silicate compound | 4) | | | | | | | | | |
| Organic resin particles | 5) | 10 | 10 | 10 | 10 | 10 | 10 | 10 | 1 | 14 |
| Organic resin particles | 6) | | | | | | | | | |
| Inorganic glass particles A | 7) | | | | | | | | | |
| Inorganic glass particles B | 8) | | | | | | | | | |
| Inorganic fibers A | 9) | 10 | 10 | 10 | 10 | 10 | 10 | 10 | 1 | 14 |
| Inorganic fibers B | 10) | | | | | | | | | |

TABLE 3

| Example | | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Workability | 4T | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| | 6T | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| Hydrophilicity | Immediately after adding the agent conferring hydrophilicity | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| | 6 hours after adding the agent conferring hydrophilicity | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| Staining Resistance | Immediately after adding the agent conferring hydrophilicity | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| | 6 hours after adding the agent conferring hydrophilicity | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| Design stability of the wrinkle pattern | | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| Solvent resistance | | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| Water resistance | | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |

TABLE 4

| Comparative Example | | 1 | 2 | 3 | 4 | 5 | 6 | 7 | 8 |
|---|---|---|---|---|---|---|---|---|---|
| Titanium oxide | | 50 | 50 | 50 | 50 | 50 | 50 | 50 | 50 |
| Acrylic resin | | 80 | 80 | 80 | 80 | 80 | 80 | 80 | 80 |
| Melamine resin | 1) | 20 | 20 | 20 | 20 | 20 | 20 | 20 | 20 |
| De-watering agent | 2) | 5 | 5 | 0 | 15 | 5 | 5 | 5 | 5 |
| Blocked sulfonic acid compound | | 1.5 | 1.5 | 1.5 | 1.5 | 0.05 | 10 | 1.5 | 1.5 |
| (Amine/Sulfonic acid (mol ratio)) | | (0.1) | (1.3) | (0.6) | (0.6) | (0.6) | (0.6) | (0.6) | (0.6) |
| Silicate compound | 3) | 5 | 5 | 5 | 5 | 5 | 5 | 0.1 | 5 |
| Silicate compound | 4) | | | | | | | | |
| Organic resin particles | 5) | 10 | 10 | 10 | 10 | 10 | 10 | 10 | 10 |

TABLE 4-continued

| Comparative Example | | 1 | 2 | 3 | 4 | 5 | 6 | 7 | 8 |
|---|---|---|---|---|---|---|---|---|---|
| Organic resin particles | 6) | | | | | | | | |
| Inorganic glass particles A | 7) | | | | | | | | |
| Inorganic glass particles B | 8) | | | | | | | | |
| Inorganic fibers A | 9) | 10 | 10 | 10 | 10 | 10 | 10 | 10 | 10 |
| Inorganic fibers B | 10) | | | | | | | | |

TABLE 5

| Comparative Example | | 9 | 10 | 11 | 12 | 13 | 14 | 15 | 16 |
|---|---|---|---|---|---|---|---|---|---|
| Titanium oxide | | 50 | 50 | 50 | 50 | 50 | 50 | 50 | 50 |
| Acrylic resin | | 80 | 80 | 80 | 80 | 80 | 80 | 80 | 55 |
| Melamine resin | 1) | 20 | 20 | 20 | 20 | 20 | 20 | 20 | 45 |
| De-watering agent | 2) | 5 | 5 | 5 | 5 | 5 | 5 | 5 | 5 |
| Blocked sulfonic acid compound | | 1.5 | 1.5 | 1.5 | 1.5 | 1.5 | 1.5 | 1.5 | 1.5 |
| (Amine/Sulfonic acid (mol ratio) | | (0.6) | (0.6) | (0.6) | (0.6) | (0.6) | (0.6) | (0.6) | (0.6) |
| Silicate compound | 3) | 5 | 5 | 5 | 5 | 5 | 5 | 5 | 5 |
| Silicate compound | 4) | | | | | | | | |
| Organic resin particles | 5) | | 20 | | 20 | | | | 20 |
| Organic resin particles | 6) | | | | | 25 | | | |
| Inorganic glass particles A | 7) | | | 20 | 20 | | | | |
| Inorganic glass particles B | 8) | | | | | | 25 | | |
| Inorganic fibers A | 9) | | 20 | 20 | | | | | |
| Inorganic fibers B | 10) | | | | | | | 25 | |

TABLE 5

| | Comparative Example | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Workability | 4T | ○ | ○ | ○ | ○ | ○ | ○ | ○ | ○ | ○ | X | X | X | ○ | ○ | ○ | X |
| | 6T | ○ | ○ | ○ | ○ | ○ | X | ○ | ○ | ○ | ○ | ○ | ○ | ○ | ○ | ○ | X |
| Hydrophilicity | Immediately after adding the agent conferring hydrophilicity | ○ | ○ | ○ | ○ | ○ | ○ | X | ○ | ○ | ○ | ○ | ○ | ○ | ○ | ○ | ○ |
| | 6 hours after adding the agent conferring hydrophilicity | ○ | X | X | ○ | ○ | X | X | ○ | ○ | ○ | ○ | ○ | ○ | ○ | ○ | ○ |
| Staining Resistance | Immediately after adding the agent conferring hydrophilicity | ○ | ○ | ○ | ○ | ○ | ○ | X | ○ | ○ | ○ | ○ | ○ | ○ | ○ | ○ | ○ |
| | 6 hours after adding the agent conferring hydrophilicity | ○ | X | X | ○ | ○ | X | X | ○ | ○ | ○ | ○ | ○ | ○ | ○ | ○ | ○ |
| Design stability of the wrinkle pattern | | X | ○ | ○ | X | X | ○ | ○ | ○ | X | ○ | ○ | ○ | X | X | X | X |
| Solvent resistance | | ○ | ○ | ○ | ○ | X | ○ | ○ | ○ | ○ | ○ | ○ | ○ | ○ | ○ | ○ | ○ |
| Water resistance | | ○ | ○ | ○ | ○ | ○ | ○ | ○ | X | ○ | ○ | ○ | ○ | ○ | ○ | ○ | ○ |

The proper ranges for the (D) component and the (F) component in this invention are shown in FIG. 1.

In FIG. 1 the mol ratio of triethylamine (TEA) with respect to p-toluenesulfonic acid (PTSA) in the (D) component blocked sulfonic acid compound is shown on the abscissa and the amount of (F) component particles or fibers added is shown on the ordinate.

As shown in FIG. 1, the design stability of the wrinkle pattern is good, the stability of the agent which imparts hydrophilicity is also good and the staining resistance is also good with a TEA/PTSA mol ratio in the range from 0.1 to 0.9 and an amount of (F) component added per 100 parts by mass of the total solid fraction of the (A) component and the (B) component in the range from 1 to 30 parts by mass.

The invention claimed is:

1. A resin composition for forming a stable wrinkle patterned paint film comprising
   (A) a hydroxyl group containing acrylic resin comprising a hydroxyl group value of from 5 to 200 mgKOH/g and a number average molecular weight of from 500 to 20,000,
   (B) a hexakisalkyoxymethylated melamine resin,
   (C) a de-watering agent,
   (D) a blocked sulfonic acid compound having a blocking agent comprising a tertiary amine compound of boiling point from 50 to 300° C. where the mol ratio of the tertiary amine with respect to the sulfonic acid is from 0.2 to 0.9,
   (E) a silicate compound, and
   (F) at least one type of material selected from among (a) organic resin particles of average particle diameter not more than 40 μm, (b) inorganic glass particles of average particle diameter not more than 100 μm and (c) inorganic fibers of average length not more than 300 μm,
   further comprising a mass ratio of the (A) component and the (B) component as solid fractions that is from 60/40 to 90/10, and in which, per 100 parts by mass in total as the solid fractions of the (A) component and the (B) component, the amount of the (C) component included as solid fraction is from 0.1 to 10 parts by mass, the amount of the (D) component included as solid fraction is from 0.1 to 5 parts by mass, the amount of the (E) component included as solid fraction is from 0.5 to 10 parts by mass and the amount of the (F) component included as solid fraction is from 1 to 30 parts by mass;

wherein the resin composition, diluted with solvent, is capable of forming a paint film that has a stable wrinkle pattern after painting and baking.

2. The resin composition of claim 1 comprising the (E) silicate compound that is at least one of an organosilicate represented by General Formula (I) below, an organosilicate represented by General Formula (2) below, a condensate of either one or both of the organosilicates of general formulas (1) and (2), or a partial hydrolyzate of said condensate, wherein:

General Formula (1) is:

(1)

and $R^1$ is a phenyl group or an alkyl group having from 1 to 18 carbon atoms, and $R^2$ is an alkyl group having from 1 to 6 carbon atoms, and General Formula (2) is:

(2)

and $R^3$ is a hydrogen atom or an alkyl group having from 1 to 6 carbon atoms.

3. A resin composition for forming a stable wrinkle patterned paint film comprising
(A) a hydroxyl group containing acrylic resin comprising a hydroxyl group value of from 5 to 200 mg KOH/g and a number average molecular weight of from 500 to 20,000,
(B) a hexakisalkyoxymethylated melamine resin,
(C) a de-watering agent,
(D) a blocked sulfonic acid compound having a blocking agent comprising a tertiary amine compound of boiling point from 50 to 300° C. where the mol ratio of the tertiary amine with respect to the sulfonic acid is from 0.2 to 0.9,
(E) a silicate compound that is at least one of an organosilicate represented by General Formula (I) below, an organosilicate represented by General Formula (2) below, a condensate of either one or both of the organosilicates of general formulas (1) and (2), or a partial hydrolyzate of said condensate, wherein:

General Formula (1) is:

(1)

and $R^1$ is a phenyl group or an alkyl group having from 1 to 18 carbon atoms, and $R^2$ is an alkyl group having from 1 to 6 carbon atoms, and General Formula (2) is:

(2)

and $R^3$ is a hydrogen atom or an alkyl group having from 1 to 6 carbon atoms, and
(F) at least one type of material selected from among (a) organic resin particles of average particle diameter not more than 40 µm, (b) inorganic glass particles of average particle diameter not more than 100 µm and (c) inorganic fibers of average length not more than 300 µm,
further comprising a mass ratio of the (A) component and the (B) component as solid fractions that is from 60/40 to 90/10, and in which, per 100 parts by mass in total as the solid fractions of the (A) component and the (B) component, the amount of the (C) component included as solid fraction is from 0.1 to 10 parts by mass, the amount of the (D) component included as solid fraction is from 0.1 to 5 parts by mass, the amount of the (E) component included as solid fraction is from 0.5 to 10 parts by mass and the amount of the (F) component included as solid fraction is from 1 to 30 parts by mass, wherein the resin composition, diluted with solvent, is capable of forming a paint film that has a stable wrinkle pattern after painting and baking.

4. The resin composition of claim 3 wherein the silicate compound is selected from the group consisting of trimethoxybutylsilane, trimethoxyethylsilane, tetrahydroxysilane, tetramethoxysilane, tetraethoxysilane, tetrapropoxysilane, tetrabutoxysilane, tetraphenoxysilane, dimethoxydiethoxysilane, and combinations thereof.

5. A resin composition for forming a stable wrinkle patterned paint film comprising
(A) a hydroxyl group containing acrylic resin comprising a hydroxyl group value of from 10 to 150 mgKOH/g and a number average molecular weight of from 1000 to 10,000,
(B) a hexakisalkyoxymethylated melamine resin,
(C) a de-watering agent,
(D) a blocked sulfonic acid compound having a blocking agent comprising a tertiary amine compound of boiling point from 50 to 300° C. where the mol ratio of the tertiary amine with respect to the sulfonic acid is from 0.3 to 0.8,
(E) a silicate compound that is at least one of an organosilicate represented by General Formula (I) below, an organosilicate represented by General Formula (2) below, a condensate of either one or both of the organosilicates of general formulas (1) and (2), or a partial hydrolyzate of said condensate, wherein:

General Formula (1) is:

(1)

and $R^1$ is a phenyl group or an alkyl group having from 1 to 18 carbon atoms, and $R^2$ is an alkyl group having from 1 to 6 carbon atoms, and General Formula (2) is:

(2)

and $R^3$ is a hydrogen atom or an alkyl group having from 1 to 6 carbon atoms, and
(F) at least one type of material selected from among (a) organic resin particles of average particle diameter not more than 40 µm, (b) inorganic glass particles of average particle diameter not more than 100 µm and (c) inorganic fibers of average length not more than 300 µm further comprising a mass ratio of the (A) component and the (B) component as solid fractions that is from 60/40 to 90/10, and in which, per 100 parts by mass in total as the solid fractions of the (A) component and the (B) component, the amount of the (C) component included as solid fraction is from 0.1 to 10 parts by mass, the amount of the (D) component included as solid fraction is from 0.1 to 5 parts by mass, the amount of the (E) component included as solid fraction is from 0.5 to 10 parts by mass and the amount of the (F) component included as solid fraction is from 1 to 30 parts by mass, wherein the resin composition, diluted with solvent, is capable of forming a paint film that has a stable wrinkle pattern after painting and baking.

* * * * *